(12) United States Patent
Hue et al.

(10) Patent No.: US 9,897,809 B2
(45) Date of Patent: *Feb. 20, 2018

(54) DATA-DISPLAY GLASSES COMPRISING AN ANTI-GLARE SCREEN

(71) Applicant: Valeo Vision, Bobigny (FR)

(72) Inventors: David Hue, Butry sur Oise (FR); Benoist Fleury, Vincennes (FR)

(73) Assignee: VALEO VISION, Bobigny (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/913,783

(22) PCT Filed: Sep. 23, 2014

(86) PCT No.: PCT/EP2014/070272
§ 371 (c)(1),
(2) Date: Feb. 23, 2016

(87) PCT Pub. No.: WO2015/044148
PCT Pub. Date: Apr. 2, 2015

(65) Prior Publication Data
US 2016/0223816 A1    Aug. 4, 2016

(30) Foreign Application Priority Data
Sep. 26, 2013 (FR) .................... 13 59273

(51) Int. Cl.
*G02B 27/01* (2006.01)
*G02B 5/30* (2006.01)
(Continued)

(52) U.S. Cl.
CPC ........... *G02B 27/0172* (2013.01); *G02B 5/30* (2013.01); *G02C 7/101* (2013.01); *G02C 7/12* (2013.01); *G02F 1/13306* (2013.01); *G02F 1/133528* (2013.01); *G02B 2027/0118* (2013.01); *G02B 2027/0178* (2013.01); *G02F 2001/133531* (2013.01)

(58) Field of Classification Search
CPC ............. H04N 13/0429; H04N 13/044; G02B 27/017; G09G 2320/0233; G09G 2320/0626; G09G 2320/0646
See application file for complete search history.

(56) References Cited

U.S. PATENT DOCUMENTS 3,199,114 A    8/1965    Malifaud
3,961,181 A    6/1976    Golden
(Continued)

FOREIGN PATENT DOCUMENTS

CN    301804989    1/2012
CN    102707456 A    10/2012
(Continued)

*Primary Examiner* — Antonio A Caschera
(74) *Attorney, Agent, or Firm* — Oblon, McClelland, Maier & Neustadt, L.L.P.

(57) ABSTRACT

A pair of spectacles equipped with at least one lens and intended to be worn by a user, the spectacles comprising displaying means allowing data to be projected into a field of view of the user, and an anti-glare screen provided with a variable transmission coefficient allowing the intensity of incident light intended to pass through the lens toward the user to be attenuated, the spectacles being configured to adapt the transmission coefficient of the anti-glare screen depending on the intensity of the incident light.

20 Claims, 2 Drawing Sheets

Figure 1:
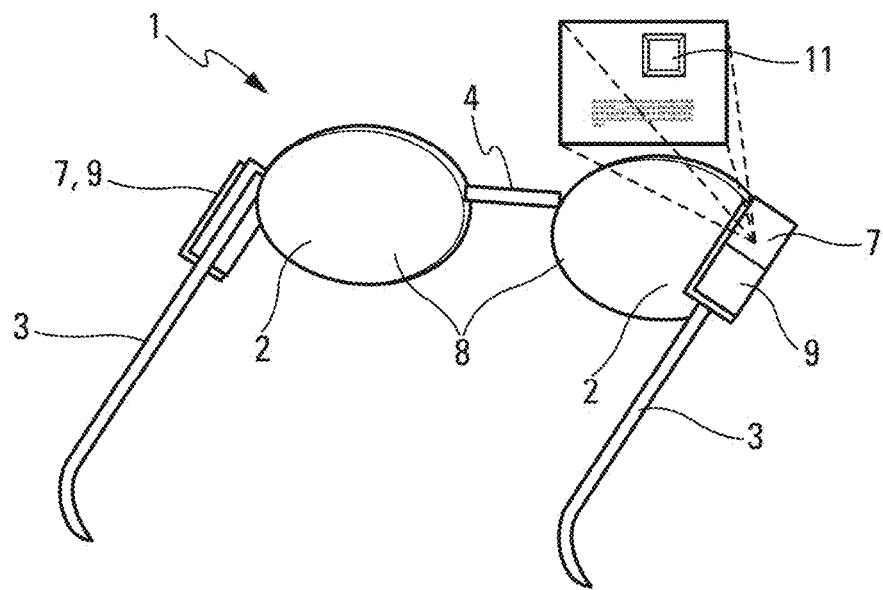

(51) Int. Cl.
    *G02C 7/10* (2006.01)
    *G02C 7/12* (2006.01)
    *G02F 1/133* (2006.01)
    *G02F 1/1335* (2006.01)

(56) References Cited

U.S. PATENT DOCUMENTS

| | | |
|---|---|---|
| 4,286,308 A | 8/1981 | Wolff |
| 4,311,368 A | 1/1982 | Saito et al. |
| 4,848,890 A | 7/1989 | Horn |
| 5,258,607 A | 11/1993 | Agostini et al. |
| 5,276,539 A | 1/1994 | Humphrey |
| 5,486,938 A | 1/1996 | Aigrain |
| 5,671,035 A | 9/1997 | Barnes |
| 5,835,458 A | 11/1998 | Bischel et al. |
| 5,859,735 A | 1/1999 | De Vries |
| 5,911,018 A | 6/1999 | Bischel et al. |
| 5,978,524 A | 11/1999 | Bischel et al. |
| 6,078,704 A | 6/2000 | Bischel et al. |
| 6,118,908 A | 9/2000 | Bischel et al. |
| 6,133,686 A | 10/2000 | Inoue et al. |
| 6,141,465 A | 10/2000 | Bischel et al. |
| 6,313,587 B1 | 11/2001 | MacLennan et al. |
| 6,384,982 B1 | 5/2002 | Spitzer |
| 6,424,448 B1 | 7/2002 | Levy |
| 6,493,128 B1 | 12/2002 | Agrawal et al. |
| 6,522,794 B1 | 2/2003 | Bischel et al. |
| 6,557,995 B1 | 5/2003 | Edwards |
| 6,568,738 B1 | 5/2003 | Braun |
| 6,624,564 B2 | 9/2003 | Wang et al. |
| 6,626,532 B1 | 9/2003 | Nishioka et al. |
| 6,928,180 B2 | 8/2005 | Stam et al. |
| 7,134,707 B2 | 11/2006 | Isaac |
| 7,684,105 B2 | 3/2010 | Lamontagne et al. |
| 7,751,122 B2 | 7/2010 | Amitai |
| 7,874,666 B2 | 1/2011 | Xu et al. |
| 7,893,890 B2 | 2/2011 | Kelly et al. |
| 7,970,172 B1 | 6/2011 | Hendrickson |
| 8,197,931 B2 | 6/2012 | Ueda et al. |
| 8,208,504 B2 | 6/2012 | Dantus et al. |
| 8,233,102 B2 | 7/2012 | Burlingame et al. |
| D665,009 S | 8/2012 | Nibauer et al. |
| D717,865 S | 11/2014 | Votel et al. |
| 8,964,298 B2 | 2/2015 | Haddick et al. |
| 8,976,084 B2 | 3/2015 | Hamdani et al. |
| D734,808 S | 7/2015 | Markovitz et al. |
| 9,087,471 B2 | 7/2015 | Miao |
| D735,799 S | 8/2015 | Markovitz et al. |
| 9,186,963 B2 | 11/2015 | Tewari et al. |
| D746,362 S | 12/2015 | Markovitz et al. |
| D747,403 S | 1/2016 | Markovitz et al. |
| 9,277,159 B2 | 3/2016 | Shin et al. |
| D763,944 S | 8/2016 | Shin |
| D765,761 S | 9/2016 | Votel et al. |
| D769,358 S | 10/2016 | Markovitz et al. |
| D769,362 S | 10/2016 | Markovitz et al. |
| D769,962 S | 10/2016 | Markovitz et al. |
| 9,511,650 B2 | 12/2016 | Momot |
| 2002/0175615 A1 | 11/2002 | Wang et al. |
| 2006/0140502 A1 | 6/2006 | Tseng et al. |
| 2006/0175859 A1 | 8/2006 | Isaac |
| 2007/0285759 A1 | 12/2007 | Ash et al. |
| 2008/0186604 A1 | 8/2008 | Amitai |
| 2008/0218434 A1 | 9/2008 | Kelly et al. |
| 2009/0213282 A1 | 8/2009 | Burlingame et al. |
| 2009/0213283 A1 | 8/2009 | Burlingame et al. |
| 2010/0065721 A1 | 3/2010 | Broude et al. |
| 2010/0161177 A1 | 6/2010 | Yuter |
| 2010/0194857 A1 | 8/2010 | Mentz et al. |
| 2011/0072961 A1 | 3/2011 | Jungkuist et al. |
| 2011/0233384 A1 | 9/2011 | Wu |
| 2011/0288725 A1 | 11/2011 | Yuter |
| 2012/0019891 A1 | 1/2012 | Dewell |
| 2012/0026071 A1 | 2/2012 | Hamdani et al. |
| 2012/0044560 A9 | 2/2012 | Lam et al. |
| 2012/0126099 A1 | 5/2012 | Tewari et al. |
| 2012/0180204 A1 | 7/2012 | Hawkins |
| 2012/0303214 A1 | 11/2012 | Yuter |
| 2013/0113973 A1 | 5/2013 | Miao |
| 2013/0127980 A1 | 5/2013 | Haddick et al. |
| 2013/0300911 A1 | 11/2013 | Beckman |
| 2014/0109302 A1 | 4/2014 | Casbi et al. |
| 2014/0153076 A1 | 6/2014 | Tewari et al. |
| 2014/0253816 A1 | 9/2014 | Shin et al. |
| 2015/0062469 A1 | 3/2015 | Fleury |
| 2015/0077826 A1 | 3/2015 | Beckman |
| 2016/0077400 A1 | 3/2016 | Lam et al. |
| 2016/0214467 A1 | 7/2016 | El Idrissi et al. |
| 2016/0216536 A1 | 7/2016 | Hue et al. |
| 2016/0223816 A1 | 8/2016 | Hue et al. |
| 2016/0357014 A1 | 12/2016 | Beckman |
| 2017/0023802 A1 | 1/2017 | El Idrissi et al. |

FOREIGN PATENT DOCUMENTS

| | | |
|---|---|---|
| DE | 2001086 A1 | 7/1971 |
| DE | 3836095 A1 | 4/1990 |
| DE | 102012008913 A1 | 11/2012 |
| EP | 0341519 A2 | 11/1989 |
| EP | 0459433 A1 | 12/1991 |
| EP | 0498143 A1 | 8/1992 |
| EP | 0945303 A1 | 9/1999 |
| FR | 2684770 A1 | 6/1993 |
| FR | 2693562 A1 | 1/1994 |
| FR | 2722581 A1 | 1/1996 |
| FR | 2781289 A1 | 1/2000 |
| FR | 2846756 A1 | 5/2004 |
| FR | 2941786 A1 | 8/2010 |
| FR | 2975792 A1 | 11/2012 |
| FR | 2976089 A1 | 12/2012 |
| FR | 2988493 A1 | 9/2013 |
| FR | 3010941 A1 | 3/2015 |
| FR | 3011091 A1 | 3/2015 |
| GB | 2420183 A | 5/2006 |
| GB | 2445365 A | 7/2008 |
| JP | 2004233908 A | 8/2004 |
| WO | 9210130 A1 | 6/1992 |
| WO | 9214625 A1 | 9/1992 |
| WO | 9512502 A1 | 5/1995 |
| WO | 9620846 A1 | 7/1996 |
| WO | 9827452 A1 | 6/1998 |
| WO | 2012036638 A1 | 3/2012 |
| WO | 2012115301 A1 | 8/2012 |

DATA-DISPLAY GLASSES COMPRISING AN ANTI-GLARE SCREEN

CROSS-REFERENCE TO RELATED APPLICATIONS

This application is the U.S. National Phase application of PCT Application No. PCT/EP2014/070272 filed Sep. 23, 2014, which claims priority to the French application 1359273 filed on Sep. 26, 2013, which applications are incorporated herein by reference and made a part hereof.

BACKGROUND OF THE INVENTION

1. Field of the Invention

The present invention relates to data-displaying spectacles equipped with an anti-glare screen.

2. Description of the Related Art

In the field of portable optical devices equipped with technologies related to the field of communicating data and informing, data-displaying spectacles capable of displaying data or information that may be seen by the user wearing them are known. The information is superposed, transparently or not, on the scene that the user would normally observe through the spectacles.

Such a displaying device is an optronic device allowing a user to view information, such as text, images or video, in his field of view, without needing to turn or lower his head. Thus, the user may move around and observe his environment while simultaneously having access to information.

This information may relate directly to objects and places visible through the spectacles; the image may even be made interactive, for example by adding light signals relating to the observed scene. The information may also be independent of the momentary vision of the user, and for example provide access to the Internet and/or to an electronic message, which the user may consult while retaining a view allowing him to move or act freely.

Spectacles equipped with different display technologies exist.

Patent application FR 2 976 089 describes a pair of spectacles including one or two projectors placed on the temples. The projectors project an image in front of the wearer of the spectacles, the wearer needing a medium in front of him to perceive them. As is described in patent application FR 2 941 786, which is equivalent to U.S. Pat. No. 8,976,084 and U.S. Patent Publication No. 2012/026071, the lenses of the spectacles may serve as the medium, especially if spectacles providing an augmented reality function are envisioned.

More sophisticated displaying systems allow the images to be displayed using lenses equipped with faces guiding the light in the lens, a formed image being visible to the user, such as is disclosed in U.S. Pat. No. 7,751,122.

However, the difficulty with current systems relates to the visibility of the information when luminosity is high. Specifically, under these conditions, the contrast of the information makes it hard or impossible to see if the intensity of the information is not high enough relative to incident light of high intensity. In addition, when a user moves, regular and rapid changes in luminosity occur.

Furthermore, for a pair of spectacles equipped with sunglass lenses, these lenses decrease the visibility of the information, especially if it is in color. In addition, sunglass lenses are not compatible with all data-displaying technologies.

The objective of the invention is to remedy these drawbacks, and aims to provide a pair of data-displaying spectacles usable in and adaptable to any situation, whatever the ambient light intensity.

To this end, the spectacles according to the invention, which are equipped with at least one lens and intended to be worn by a user, comprise displaying means allowing data to be projected into a field of view of the user, and an anti-glare screen provided with a variable transmission coefficient allowing the intensity of incident light intended to pass through the lens toward the user to be attenuated, the spectacles being configured to adapt the transmission coefficient of the anti-glare screen depending on the intensity of the incident light.

Thus, the spectacles allow, using a given medium incorporating all the necessary functions, data displayed on the display zone to be read despite a high luminosity. Furthermore, whatever the luminosity of the incident light, the spectacles allow the transmission coefficient of the screen to be adapted so that the wearer of the spectacles perceives a luminosity of moderate intensity whatever the situation.

The transmission coefficient of the anti-glare screen and/or of the displaying means will possibly be controlled either using control means integrated into the spectacles or located remotely. Likewise, the information relating to the luminosity will possibly originate from a sensor located on the spectacles and/or remotely.

According to various embodiments of the invention, which will possibly be employed together or separately:
  the anti-glare screen and the displaying means are positioned one relative to the other so that rays emitted by said displaying means, in order to display the data, avoid the anti-glare screen, so that effects due to reflection of the rays from said anti-glare screen are avoided;
  the displaying means are coupled to the anti-glare screen so that the light intensity of the displayed data in the displaying zone is adapted to the transmission coefficient;
  the coupling is produced by controlling the light intensity of the displayed data depending on the transmission coefficient of the anti-glare screen, the light intensity of the displayed data being modified inversely proportionally to the transmission coefficient, in order to obtain a similar perception of the data by the user whatever the amount of incident light;
  the transmission coefficient is determined by pulse width modulation with a variable duty cycle and a fixed frequency;
  the light intensity of the displayed data is determined by pulse width modulation with a variable duty cycle and a fixed frequency;
  the light intensity and the transmission coefficient are in phase and have the same duty cycle;
  the spectacles comprise means for controlling the duty cycle or duty cycles;
  the anti-glare screen is placed on a first side of the lens, the incident light being intended to pass through the lens from a second side of the lens to the first side;
  the anti-glare screen is provided with a vertical polarization layer and a horizontal polarization layer, which are placed on the lens;
  the anti-glare screen is provided with a liquid-crystal layer arranged between the two polarization layers;

the anti-glare screen is borne by the lens;

the displaying means are configured to transmit the rays using the lens;

the means for displaying data comprise a transmitting substrate so as to guide light, in particular said rays, by internal reflection in the lens;

the means for displaying data comprise a light source able to emit said rays into the lens; and the means for displaying data comprise an image generator.

These and other objects and advantages of the invention will be apparent from the following description, the accompanying drawings and the appended claims.

BRIEF DESCRIPTION OF THE ACCOMPANYING DRAWINGS

Figure 2:
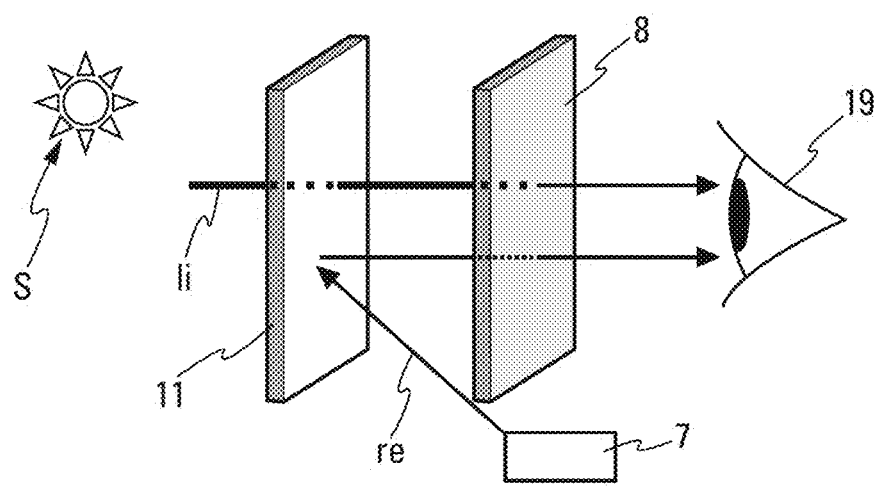
Figure 3:
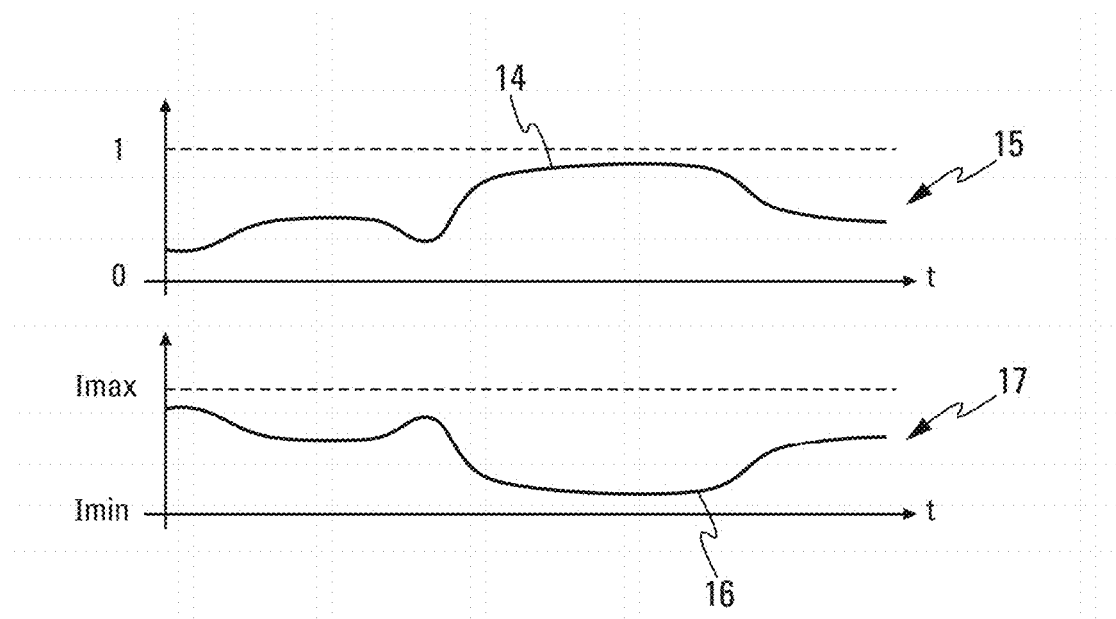
Figure 4:
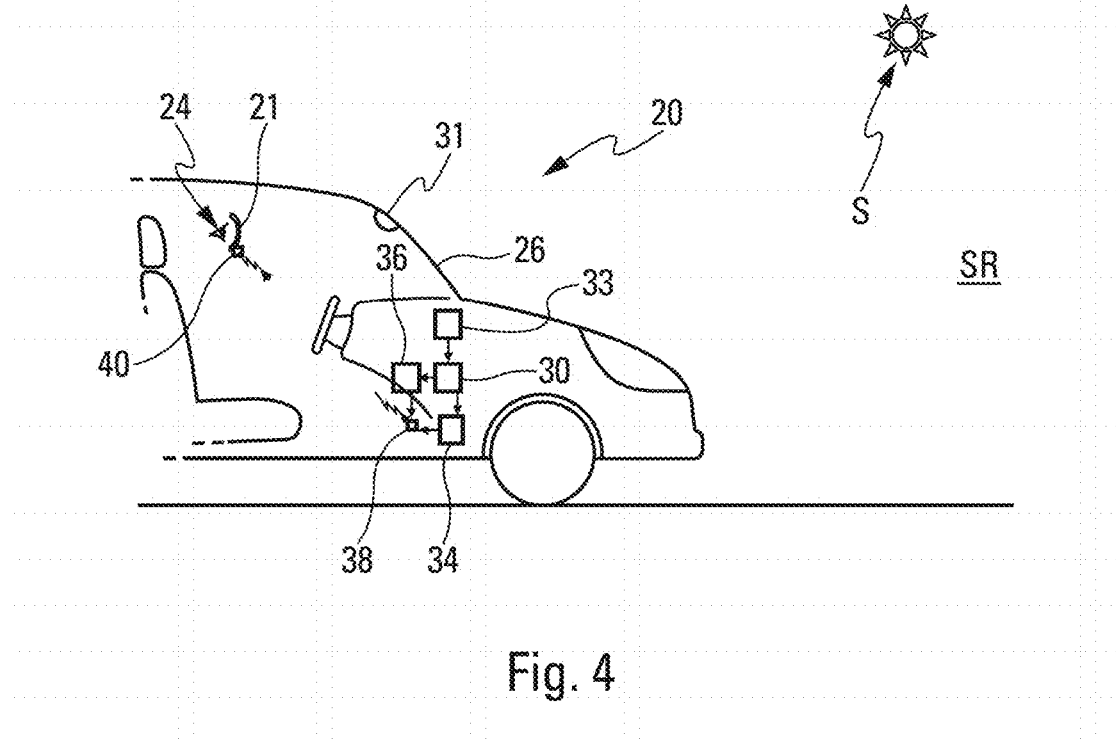

The invention will be better understood in light of the following description, which is given merely by way of indication and not intended to be limiting, accompanied by the appended drawings, in which:

FIG. 1 schematically illustrates a perspective view of a pair of data-displaying spectacles according to the invention;

FIG. 2 schematically illustrates the operating principle of one embodiment of the spectacles according to the invention;

FIG. 3 shows a graph showing the light transmission of the anti-glare screen and a graph showing the intensity of the displayed data; and FIG. 4 schematically illustrates a partial cross-sectional view of a vehicle in which the spectacles are used.

DETAILED DESCRIPTION OF THE PREFERRED EMBODIMENTS

As illustrated in FIGS. 1 and 2, the spectacles 1 according to the invention have here two lenses 2, two temples 3 and a frame 4 in which the lenses 2 are fixed. In the description of the invention, the term lens designates the object fixed in the frame 4 and through which the wearer of the spectacles 1 looks at the scene that is in front of him. Each lens 2 may be manufactured from a mineral or organic glass material for example, but also from any other material known to those skilled in the art to this end.

The eye 19 in FIG. 2 of the wearer of the spectacles 1 is located on a first side of the lenses 2, and the scene that he observes is located on a second side of the lenses 2. Thus, the incident light li striking the lenses 2 originates from the second side, then passes through the lenses 2 via the exterior face of the lenses 2, and exits via the interior face toward the wearer of the spectacles 1.

The spectacles 1 comprise means 7 for displaying data in the direction of a field of view of the user. The displaying means 7 are configured to emit rays re allowing data to be displayed.

The image containing the data advantageously forms on a virtual medium, placed a few meters away or at infinity so as to have a sufficient size to display the data.

In a first embodiment, the means 7 for displaying data comprise an image generator, here placed on the temples 3.

In a second embodiment (not illustrated), the means 7 for displaying data are configured to transmit the rays re using the lens 2. The displaying means 7 then comprise, for example, a light source able to emit into the lens 2, and a transmitting substrate so as to guide the rays re by internal reflection in the lens 2.

The spectacles 1 furthermore include an anti-glare screen 8. Advantageously, the anti-glare screen 8 and the displaying means 7 are positioned relative to each other so that the rays emitted by the displaying means 7, in order to display the data, avoid the anti-glare screen 8. Effects due to reflection of the rays from the anti-glare screen 8 are thus avoided. For example, the anti-glare screen 8 is placed on the first side of the lens 2, for example on the interior face of the lenses 2, facing the wearer of the spectacles 1.

To decrease dazzle, the anti-glare screen 8 is provided with a variable transmission coefficient 14 allowing the intensity of the incident light li to be attenuated. The transmission coefficient 14 is determined by pulse width modulation. The modulation is carried out at fixed frequency, preferably at least 100 Hz, with a duty cycle defining the transmission coefficient 14 of the screen.

The anti-glare screen 8 therefore has a light transmission coefficient 14 that varies periodically between:

a maximum value, for which transparency is maximum during a time $t_1$; and a minimum value, for which the transparency is minimum during a time $t_2$.

A duty cycle α is determined by the ratio of the duration $t_1$ during which the transmission is maximum to the duration T of the period, and therefore varies from 0 to 100%:

$$\alpha = \frac{t_1}{T}$$

By modifying the duty cycle α, the time $t_1$ during which the transparency is maximum is lengthened or shortened, relative to the time $t_2$ during which light does not pass. Thus, by increasing $t_1$, the duty cycle α increases, and by increasing $t_2$, the duty cycle α decreases. The average value of the transmission coefficient 14 is thus dependent on the value of the duty cycle α.

The scene located in front of the wearer of the spectacles 1 is therefore visible only during a fraction of time equal to the duty cycle α. The luminosity seen through the anti-glare screen 8 is therefore decreased relative to the actual luminosity by a factor equal to (1−α).

Furthermore, the spectacles 1 are configured to adapt the transmission coefficient 14 of the anti-glare screen 8 depending on the intensity of the incident light li. The spectacles 1 thus allow, in addition to displaying data for the user, him to be protected from high luminosities. Therefore, the user can read the displayed data, even if luminosity levels are high.

To this end, the spectacles 1 here comprise means 9 for controlling the transmission coefficient 14, which either control the instantaneous value or average value of the transmission coefficient 14. For example, by choosing a given duty cycle α, a corresponding transmission coefficient 14 is defined.

Thus, the duty cycle α is variable and chosen depending on the light intensity 16 of the incident light li. In order to measure the light intensity 16 of the incident light li, the spectacles 1 will possibly comprise a luminosity sensor (not shown) that delivers the measurement to the controlling means 9. The controlling means 9 set the value of the duty cycle α depending on this measurement.

In a first embodiment, the anti-glare screen 8 is equipped with a vertical polarization layer and a horizontal polarization layer, which are placed on the lens 2, and a liquid-crystal layer that is arranged between the two polarization layers. The polarization layers each polarize the incident light li in a different direction. In the liquid-crystal layer, the direction of the polarized light is modified by the liquid crystals. The orientation of the liquid crystals determines the polarization direction of the light. Thus, when they are oriented in a way that modifies the polarization to the same direction as that of the following polarization layer, the light passes through. In contrast, if the direction is different, the light is not transmitted to the wearer of the spectacles 1.

The modulation is carried out by orienting the liquid crystals in the same direction as that of the following polarization layer during the time $t_1$, in order to transmit the light, then by orienting it in a different direction during the time $t_2$, in order to block the light.

In a second embodiment, the anti-glare screen 8 is equipped with a MEMS-type microelectromechanical layer (MEMS standing for microelectromechanical system) placed on the lens 2. This layer is composed of electrically actuatable microelectronic elements that block or let pass the incident light li. The microelectromechanical systems are for example of the type described in document U.S. Pat. No. 7,684,105. Here, the modulation is carried out by letting pass the incident light li during the time $t_1$, and by blocking it during the time $t_2$, by actuation of the microelectromechanical layer.

In the various illustrated embodiments, the displaying means 7 and the anti-glare screen 8 are furthermore coupled so that the light intensity 16 allowing the data to be displayed is adapted to the transmission coefficient 14 in order to be visible by the wearer.

The display intensity of the displaying means 7 is correlated to the value of the transmission coefficient 14 of the anti-glare screen 8 with the aim of preserving the same amount of light originating from the displayed data, which reach the eye of the wearer of the spectacles 1. To this end, according to a first embodiment, the light intensity 16 of the displayed data is modified inversely proportionally to the transmission coefficient 14, in order to obtain a similar perception of the data by the user, whatever the amount of incident light li, as is shown in FIG. 3, in which two graphs 15, 17 are superposed. In the graph 15, the transmission coefficient 14 varies between 0 and 1 in the time t. In the graph 17, the light intensity 16 varies between a minimum value $l_{min}$ and a maximum value $l_{max}$ in the time t. When the transmission of the anti-glare screen 8 increases, the light intensity 16 of the data decreases proportionally and reciprocally.

In other words, the spectacles 1 simultaneously allow the transmission coefficient 14 of the anti-glare screen 8 to be adapted depending on the intensity of the incident light li so that the wearer of the spectacles 1 is not dazzled, and the light intensity 16 of the data displayed in the display zone 11 to be adapted depending on the transmission coefficient 14 of the anti-glare screen 8, in order for these data to be perceivable in a similar way whatever the situation.

Thus, the coupling of a pair of data-displaying spectacles 1 and an anti-glare system allows a satisfactory contrast to be preserved for the displayed information, independently of the light level or glare level of the scene in front of which the wearer of the spectacles 1 finds himself.

According to one particular embodiment, the light intensity 16 of the displayed data is also set by pulse width modulation with a variable duty cycle α and a fixed frequency. The data appear only during the time $t_1$ at a given reference intensity, the displaying means 7 not displaying data in the display zone 11 during the time $t_2$. The light intensity 16 of the displayed data is controlled by varying the coefficient α, thereby increasing or decreasing the display time $t_1$ relative to a constant-period duration T. In this case, the controlling means 9 also control the duty cycle α of the light intensity 16 of the displayed data.

To correlate the light intensity 16 of the data and the transmission coefficient 14, the light intensity 16 and the anti-glare screen 8 are in phase with an identical ratio of the duty cycle α. Thus, the data are displayed when the anti-glare screen 8 lets the light pass, and are not if the anti-glare screen 8 is opaque. Nevertheless, the reference intensity will possibly be adapted to retain a similar perceived intensity whatever the ratio of the duty cycle α. Thus, if the time $t_1$ increases because of a low luminosity, the reference intensity is decreased proportionally. Identically, if the time $t_1$ decreases because of a high luminosity, the reference intensity is increased proportionally.

In a specific application described below, the spectacles 1 are used as a device for assisting with driving an automotive vehicle 20. This application is described by way of example, but does not limit the application of the spectacles 1 of the invention to this example.

FIG. 4 shows this device for assisting with driving using spectacle lenses 21 according to the invention, though this application must not be considered to be limiting.

It may be seen that when it is sunny, especially at the end of the day when the height of the sun S above the horizon is low, the road scene SR in front of the vehicle 20 is brightly illuminated. The driver 24 therefore runs the risk not only of being dazzled, but also of not being able to distinguish details in this road scene SR that are important for his safety, for example road signs warning of a nearby source of danger, or the state of the road surface over which he is driving. The same goes for nighttime driving, during which the driver 24 may be dazzled by the lights of other vehicles.

The spectacle lenses 21 then serve to protect the driver 24 or passengers who are wearing them against any form of dazzle or substantial variation in the incident light intensity. However, the driver 24 must for example be able to visually access driving-related information such as that conventionally displayed on the dashboard, and which are not accessible if the average value of the transmission coefficient 14 is low. By virtue of the invention, this information is displayed directly on the spectacle lenses 21, with a light intensity determined so that it is visible by the wearer of the spectacle lenses 21.

The invention therefore makes provision in this application for the driver 24 to be equipped with a pair of adaptive spectacle lenses 21 in order to modulate the amount of light reaching the eye 19 of the driver 24, while simultaneously presenting him with information. A single spectacle lens 21 has been shown for the sake of clarity of the drawing.

Furthermore, this device comprises means 30 for controlling the transmission coefficient, which are here located remotely from the spectacle lenses 21. The controlling means 30 are for example arranged in the passenger compartment of the vehicle 20, and communicate control commands to the spectacle lenses 21.

To control the transmission coefficient of the spectacle lenses 21, the invention makes provision for a photosensitive sensor 31 to be used to measure the luminosity of the road scene SR in front of the vehicle 20.

The photosensitive sensor 31 is here located, for example, on the interior face of the windshield 26 of the vehicle 20, level with the interior rear-view mirror (not shown), i.e. in the middle of the upper portion of the windshield 26. This position makes it possible to gather information that is particularly representative of the luminosity outside the vehicle 20, issued from the road scene SR.

The output signal SL from the photosensitive sensor 31 is received and processed by a circuit 33 able to convert the output signal SL into a control signal SC for controlling the transmission coefficient of the spectacle lenses 21, the control signal SC being in turn received by the means 30 for controlling the transmission coefficient of the spectacle lenses 21.

The controlling means 30 control a circuit 34 for controlling the transmission coefficient of the spectacle lenses 21, which itself comprises an emitter 38, for example of ultrasonic, infrared or radio waves, implementing a wireless communication protocol, for example meeting the Bluetooth or Wi-Fi (registered trademarks) standards. The spectacle lenses 21 are provided with a receiver 40 of the same remote-control waves RCW.

Specifically, in response to the output signal SL output by the photosensitive sensor 31, representative of the luminosity of the road scene SR in front of the vehicle 20, the circuit 33 generates a control signal SC, depending on the output signal SL. The control signal SC is then transmitted by the emitter 38 of the control circuit 34, via the RCW waves and the receiver 40, to the spectacle lenses 21.

The transmission coefficient 14 of the spectacle lenses 21 will thus be modulated depending on the control signal SC received, i.e. depending on the luminosity measured by the photosensitive sensor 31.

The device also comprises means 36 for generating data to be displayed, which will also possibly be located in the passenger compartment, remotely from the spectacle lenses 21. The generating means 36 communicate the data to the spectacle lenses 21.

The communication between the means 36 for generating data and the spectacle lenses 21 is also carried out via wireless communication, for example implementing the same protocol as that employed by the controlling means 30 and the spectacle lenses 21, optionally with the same emitter 38 and/or the same receiver 40.

Thus, the generating means 36 transmit the data with a given intensity command, determined depending on the transmission coefficient 14 defined by the controlling means 30.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A pair of spectacles equipped with at least one lens and intended to be worn by a user, said spectacles comprising displaying means allowing data to be projected into a field of view of said user, and an anti-glare screen provided with a variable transmission coefficient allowing an intensity of incident light intended to pass through said at least one lens toward said user to be attenuated, said spectacles being configured to adapt said transmission coefficient of said anti-glare screen depending on said intensity of incident light;
    wherein said displaying means is external to said at least one lens and said anti-glare screen so that rays emitted by said displaying means avoid and do not pass through said anti-glare screen and are displayed external of said anti-glare screen, said anti-glare screen facing said user and being placed on or incorporated in said at least one lens;
    wherein said spectacles simultaneously allow said transmission coefficient of said anti-glare screen to be adapted in response to an intensity of said incident light and a light intensity of said data displayed in said field of view is adapted in response to said transmission coefficient of said anti-glare screen when said data is displayed in said field of view.

2. The spectacles as claimed in claim 1, in which said anti-glare screen and said displaying means are positioned one relative to the other so that rays emitted by said displaying means, in order to display said data, avoid said anti-glare screen.

3. The spectacles as claimed in claim 2, in which said displaying means are coupled to said anti-glare screen so that a light intensity of said data is adapted to said transmission coefficient.

4. The spectacles as claimed in claim 2, in which said transmission coefficient is determined by pulse width modulation with a variable duty cycle and a fixed frequency.

5. The spectacles as claimed in claim 2, in which a light intensity of said data is determined by pulse width modulation with a variable duty cycle and a fixed frequency.

6. The spectacles as claimed in claim 1, in which said displaying means are coupled to said anti-glare screen so that a light intensity of said displayed data is adapted to said transmission coefficient.

7. The spectacles as claimed in claim 6, in which the coupling is produced by controlling said light intensity of said displayed data depending on said transmission coefficient of said anti-glare screen, said light intensity of said displayed data being modified inversely proportionally to said transmission coefficient.

8. The spectacles as claimed in claim 6, in which said transmission coefficient is determined by pulse width modulation with a variable duty cycle and a fixed frequency.

9. The spectacles as claimed in claim 1, in which said transmission coefficient is determined by pulse width modulation with a variable duty cycle and a fixed frequency.

10. The spectacles as claimed in claim 9, in which a light intensity and said transmission coefficient are in phase and have the same duty cycle.

11. The spectacles as claimed in claim 9, in which said spectacles comprise means for controlling said variable duty cycle.

12. The spectacles as claimed in claim 1, in which a light intensity of said data is determined by pulse width modulation with a variable duty cycle and a fixed frequency.

13. The spectacles as claimed in claim 12, in which said light intensity and said transmission coefficient are in phase and have the same duty cycle.

14. The spectacles as claimed claim 1, in which said anti-glare screen is situated on by said at least one lens.

15. The spectacles as claimed in claim 1, in which said anti-glare screen is placed on a first side of said at least one lens, said incident light being intended to pass through said at least one lens from a second side of said at least one lens to said first side.

16. The spectacles as claimed in claim 15, in which said anti-glare screen is provided with a liquid-crystal layer arranged between two polarization layers.

17. The spectacles as claimed in claim 1, in which said anti-glare screen is provided with a vertical polarization layer and a horizontal polarization layer, which are placed on said at least one lens.

18. The spectacles as claimed in claim 1, in which said means for displaying data comprise a transmitting substrate so as to guide light, in particular rays, by internal reflection in said at least one lens.

19. The spectacles as claimed in claim 18, in which said means for displaying data comprise a light source able to emit said rays into said at least one lens.

20. A device for assisting with driving, especially at night, an automotive vehicle, comprising spectacles as claimed in claim 1.

* * * * *